United States Patent
Ayyagari et al.

(10) Patent No.: US 8,231,062 B1
(45) Date of Patent: Jul. 31, 2012

(54) FORMABLE RFID TAG

(75) Inventors: Arun Ayyagari, Seattle, WA (US);
Kevin Yong Ung, Bellevue, WA (US);
Winfeng Li, Renton, WA (US); William P. Coop, Buckley, WA (US); Thanh D. Hoang, Edgewood, WA (US); Swanee Yourkowski, Burien, WA (US); Rebecca Shore, Seattle, WA (US); Yucheng Zheng, Sammamish, WA (US); Robert Lee Avery, Woodinville, WA (US); Christopher B. Kettering, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/900,121

(22) Filed: Oct. 7, 2010

(51) Int. Cl.
*G06K 19/05* (2006.01)
(52) U.S. Cl. ........................................ 235/492; 235/487
(58) Field of Classification Search .................. 235/492, 235/487, 493, 462.46, 272.02
See application file for complete search history.

(56) References Cited

U.S. PATENT DOCUMENTS

| | | |
|---|---|---|
| 681,284 A1 | 11/2004 | Heinrich et al. |
| 684,212 A1 | 1/2005 | Tuttle |
| 703,076 A1 | 4/2006 | Sorrells |
| 706,466 A1 | 6/2006 | Porad |
| 7,187,293 B2 * | 3/2007 | White et al. ................ 340/572.8 |
| 7,374,102 B2 * | 5/2008 | Arnold et al. .................. 235/492 |
| 7,500,610 B1 * | 3/2009 | Hadley et al. ................. 235/451 |
| 7,501,954 B1 * | 3/2009 | Chung ........................ 340/572.7 |
| 754,527 A1 | 6/2009 | Coop et al. |
| 755,108 A1 | 6/2009 | Coop |
| 758,936 A1 | 9/2009 | Ayyagari et al |
| 760,568 A1 | 10/2009 | Seah |
| 764,947 A1 | 1/2010 | Hutton |
| 7,855,643 B2 * | 12/2010 | Tuttle ......................... 340/572.1 |

OTHER PUBLICATIONS

US 604,374, 03/2000, Sorrells (withdrawn)

* cited by examiner

*Primary Examiner* — Daniel St. Cyr
(74) *Attorney, Agent, or Firm* — Parsons Behle & Latimer

(57) ABSTRACT

A formable RFID tag includes a tag inlay including a composite polymer material having a pliant and flexible pre-cured state and a hardened cured state, non-rigid RFID circuitry embedded in the tag inlay and a non-rigid RFID antenna embedded in the tag inlay and interfacing with the RFID circuitry.

20 Claims, 3 Drawing Sheets

FORMABLE RFID TAG

TECHNICAL FIELD

The disclosure generally relates to RFID (Radio Frequency Identification) tags. More particularly, the disclosure relates to an RFID tag which can be formed to match an irregular contour of a surface to which the RFID tag is applied.

BACKGROUND

As radio frequency identification technology has been introduced to the aviation industry, many challenges have confronted the transition from manual to automated information processes. One such challenge involves the limitation of the RFID tag's physical shape to a small number of form factors and the resulting inability to mount the tag on aircraft parts and materials having irregular contours.

A lack of end-user standard design requirements due to the numerous installation configurations results in challenges to meet the operational needs such as durability, usability and cost. As a result, RFID tag suppliers may design and build only what they believe will be the most common forms of RFID tag inlays. This may limit widespread deployment of RFID-based Automated Identification Technology (AIT).

Therefore, there is a need for a "flexible" and highly-durable form of high-memory/medium-memory/low-memory RFID tags for use on aircraft parts regardless of shape, size or environment. The disclosure introduces a pliable, form and cure-in-place RFID inlay capable of emulating any contour to which it is attached.

SUMMARY

The disclosure is generally directed to a formable RFID tag. An illustrative embodiment of the formable RFID tag includes a tag inlay including a composite polymer material having a pliant and flexible pre-cured state and a hardened cured state, non-rigid RFID circuitry embedded in the tag inlay and a non-rigid RFID antenna embedded in the tag inlay and interfacing with the RFID circuitry.

In some embodiments, the formable RFID tag includes a tag inlay including a composite polymer material having a pliant and flexible pre-cured state and a hardened cured state. The composite polymer material is curable upon application to air and ultraviolet light. Non-rigid RFID circuitry is embedded in the tag inlay. A non-rigid RFID antenna is embedded in the tag inlay and interfaces with the RFID circuitry.

The disclosure is further generally directed to a formable RFID tag fabrication method. An illustrative embodiment of the method includes providing non-rigid RFID circuitry; providing a non-rigid RFID antenna; providing a pre-cured, pliant and flexible composite polymer material; forming an RFID tag by encapsulating the RFID circuitry and the RFID antenna in the composite polymer material; providing a surface having an irregular contour; applying and conforming the RFID tag to the irregular contour of the surface; and curing the composite polymer material of the RFID tag.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Figure 1:
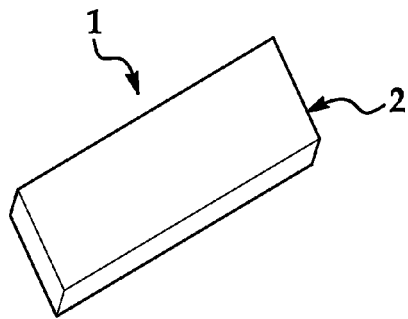
FIG. 1 is a perspective view of an illustrative embodiment of the formable RFID tag.
Figure 4:
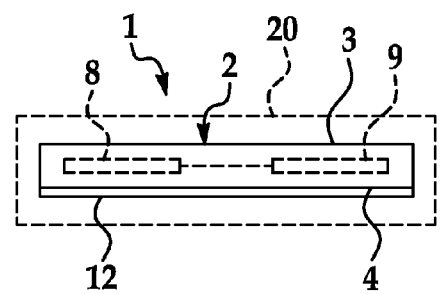
FIG. 4 is a side view of an illustrative embodiment of the formable RFID tag.

Referring initially to FIGS. 1-4, an illustrative embodiment of the formable RFID tag is generally indicated by reference numeral 1. The formable RFID tag 1 may include a tag inlay 2 which may be a light-curable composite polymer material that remains flexible until exposure to a cross-linking curing agent. In some embodiments, the composite polymer material may be of the type which remains soft and flexible until exposure to a light source (not shown). In some embodiments, the composite polymer material may be of the type which remains soft and flexible until exposure to air. The soft and formable composite polymer material of the tag inlay 2 may be capable of being formed into any desired shape. As illustrated in FIG. 1, in the pre-cured state, the tag inlay 2 may have a generally rectangular shape with an upper tag inlay surface 3 and a lower tag inlay surface 4. The pre-cured tag inlay 2 may be pliable or formable into any desired alternative shape for application to a structure 14 (FIG. 2) having an irregular contour, as will be hereinafter described. As illustrated in FIG. 4, in some embodiments, an adhesive layer 12 may be provided on the lower tag inlay surface 4 of the tag inlay 2 for attachment of the tag inlay 2 to the structure 14 as will be hereinafter described.

Non-rigid RFID circuitry 8, which may be conventional, may be embedded in the tag inlay 2 of the formable RFID tag 1. A non-rigid RFID omni-directional antenna 9, which may be conventional, may also be embedded in the tag inlay 2. The RFID antenna 9 may electrically interface with the RFID circuitry 8. The RFID circuitry 8 may be adapted to store and process information, modulate and demodulate a radio-frequency (RF) signal and perform other functions. The RFID antenna 9 may be adapted to receive and transmit RF signals for the purpose of identifying a structure 14 (FIG. 2) to which the formable RFID tag 1 is applied, as will be hereinafter described.

Figure 2:
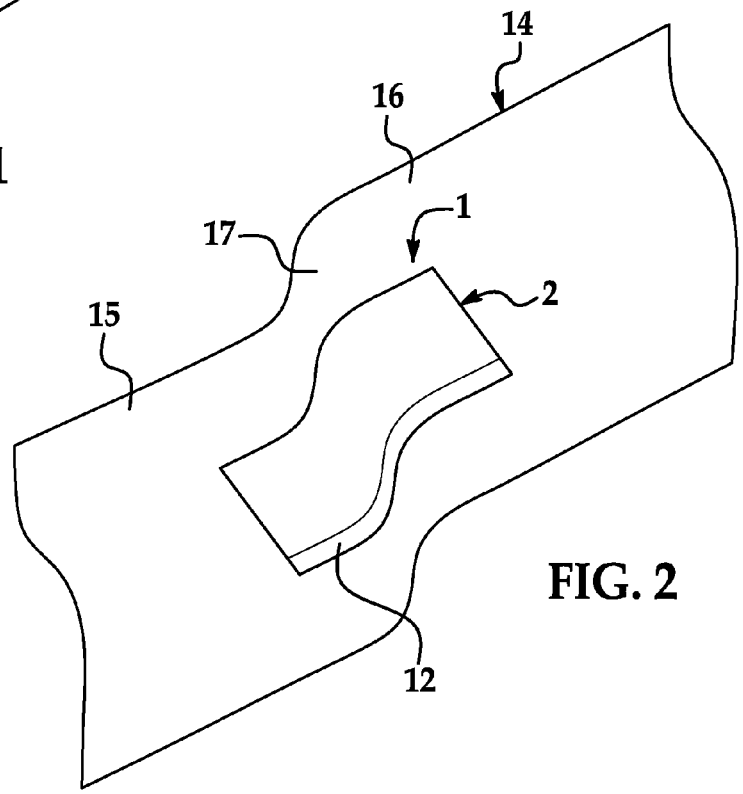
FIG. 2 is a perspective view of a structure having a surface with an irregular contour, with an illustrative embodiment of the formable RFID tag applied to the surface of the structure.
Figure 3:
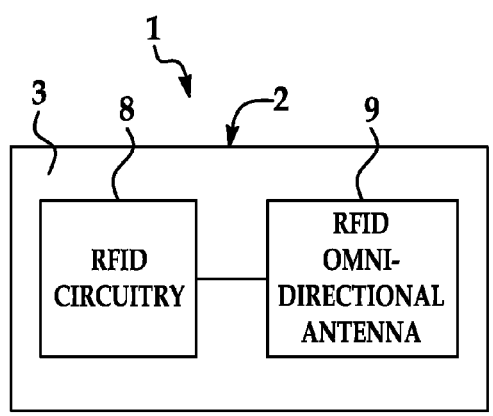
FIG. 3 is a schematic diagram of an illustrative embodiment of the formable RFID tag.

As shown in FIG. 2, in exemplary application, the pre-cured tag inlay 2 may be applied to a structure 14 having a surface with an irregular contour. The surface with irregular contour may include, for example and without limitation, a flat surface 15; a flat surface 16 which is offset relative to the flat surface 15; and a curved surface 17 which connects the flat surface 15 to the flat surface 16. As shown in FIG. 4, the pre-cured formable RFID tag 1 may be stored in an airtight packaging container 20 until application to prevent pre-curing of the tag inlay 2. Upon application, the pre-cured tag inlay 2 is pliable and formable and substantially conforms to the irregular contour of the structure 14. In some applications, the adhesive layer 12 (FIG. 4) may attach the tag inlay 2 to the irregular contour which is formed by the flat surface 15, the flat surface 16 and the curved surface 17 of the structure 14. After it is applied to the structure 14, the tag inlay 2 may be cured in place by exposure to a curing agent (not shown) such as light or air, for example and without limitation. Accordingly, the curing agent may cross-link the polymer material of the tag inlay 2 and harden the tag inlay 2. The cured tag inlay 2 may conform to the flat surfaces 15, 16 and the curved surface 17 of the structure 14. It will be appreciated by those skilled in the art that the flexible and formable pre-cured tag inlay 2 of the formable RFID tag 1 may be capable of conforming to any contour to which it is attached. When cured and hardened, the RFID tag 1 may become rigid and impervious to the environmental conditions to which it will be exposed.

In some applications, the curing process may begin upon opening of the packaging container 20 (FIG. 4) which contains the formable RFID tag 1 and exposure of the RFID tag 1 to ambient air. The curing process may be accelerated by exposure of the RFID tag 1 to a high-intensity light source (not shown) such as a UV light source that accelerates the curing process while maintaining the curing temperatures within the storage high/low temperature limits for the RFID circuitry 8 and its connections to the RFID antenna 9.

Figure 5:
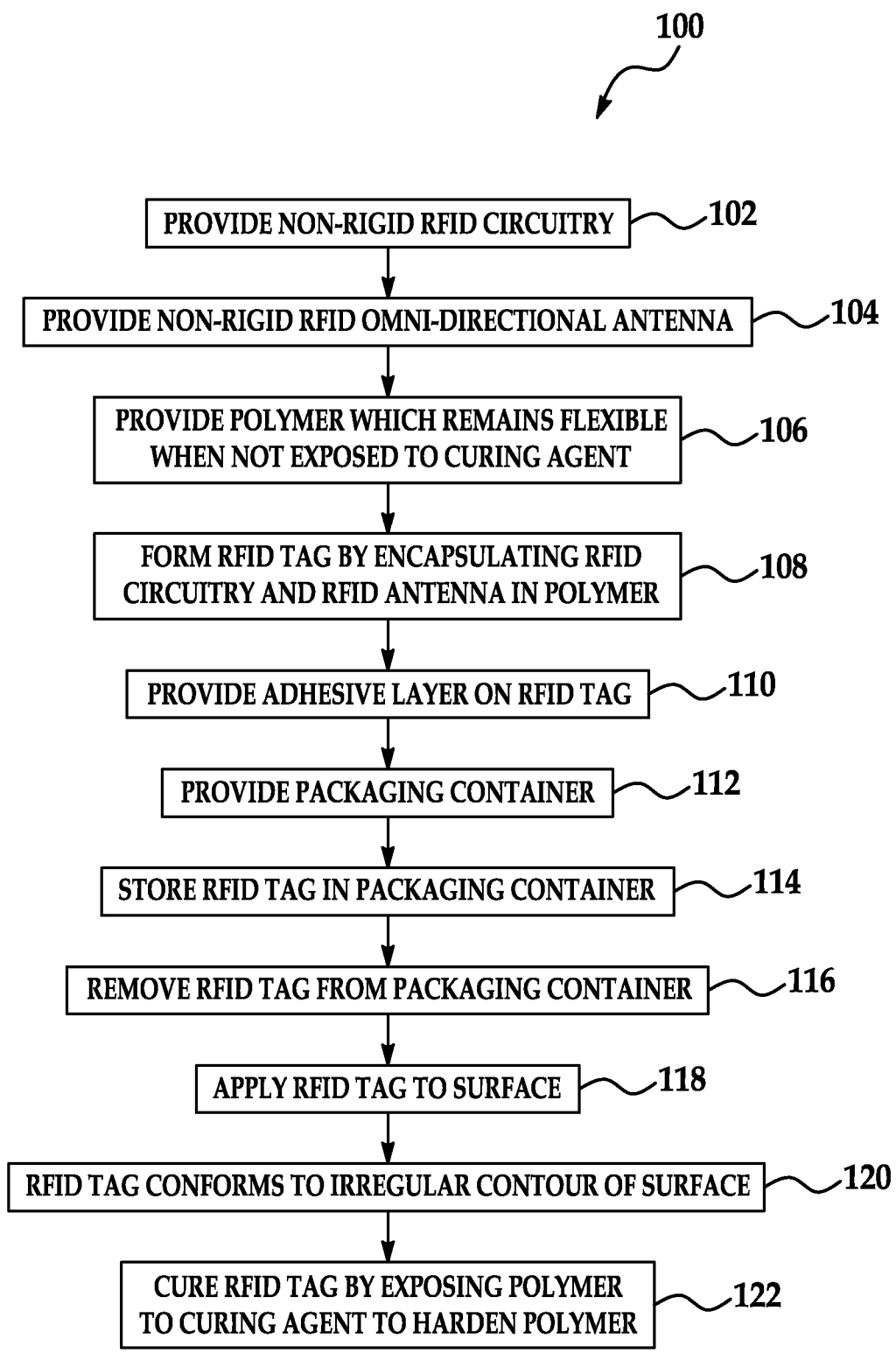
FIG. 5 is a flow diagram of an illustrative embodiment of a formable RFID tag fabrication method.

Referring next to FIG. 5, a flow diagram 100 a flow diagram of an illustrative embodiment of a formable RFID tag fabrication method is shown. In block 102, non-rigid RFID circuitry may be provided. In block 104, a non-rigid RFID omni-directional antenna may be provided. In block 106, an encapsulating composite polymer material which remains pliable and flexible when not exposed to a curing agent is provided. In block 108, an RFID tag may be formed by encapsulating the RFID circuitry and the RFID antenna in the composite polymer material. In block 110, an adhesive layer may be formed on the RFID tag. In block 112, a packaging container may be provided. In block 114, the RFID tag may be stored in the packaging container. In block 116, the packaging container may be opened and the RFID tag removed from the packaging container. In block 118, the RFID tag may be applied to a surface having an irregular contour. In block 120, the RFID tag conforms to the irregular contour of the surface. In block 122, the RFID tag may be cured by exposing the composite polymer material of the RFID tag to a curing agent to cross-link and harden the composite polymer material. In some embodiments, the curing agent may be a light source. In some embodiments, the curing agent may be air. In some embodiments, the curing agent may include ambient air to which the composite polymer material is exposed upon opening of the packaging container. The curing agent may further include ultraviolet light which accelerates the curing process after initial curing upon exposure to ambient air.

Figure 6:
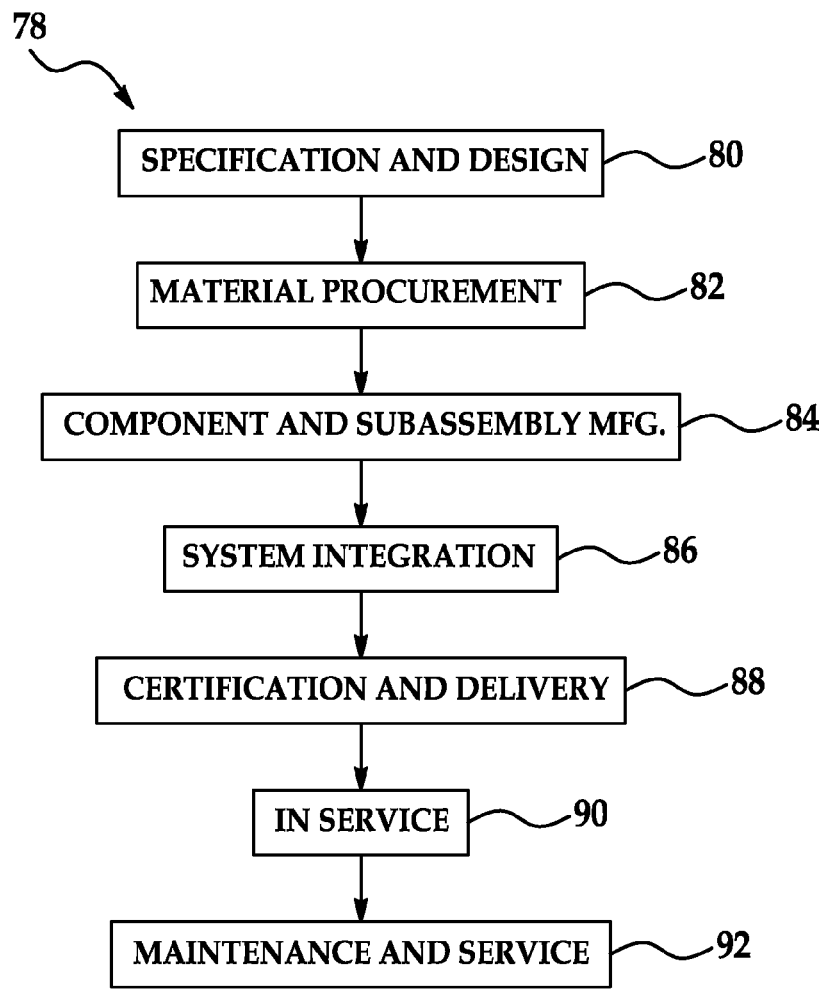
FIG. 6 is a flow diagram of an aircraft production and service methodology.
Figure 7:
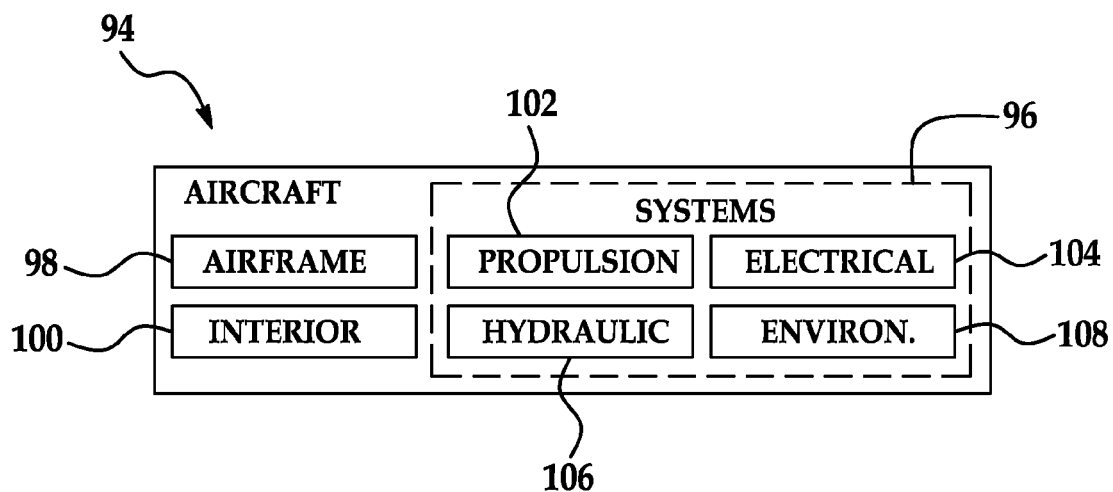
FIG. 7 is a block diagram of an aircraft.

Referring next to FIGS. 6 and 7, embodiments of the disclosure may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A formable RFID tag, comprising:
    a packaging container;
    a pre-cured tag inlay inside the packaging container, the tag inlay including a composite polymer material having a pliant and flexible pre-cured state and a hardened cured state, the packaging container preventing, when closed, curing of the tag inlay;
    RFID circuitry embedded in said tag inlay; and
    a non-rigid RFID antenna embedded in said tag inlay and interfacing with said RFID circuitry.

2. The formable RFID tag of claim 1 wherein said composite polymer material is cured by exposure to air.

3. The formable RFID tag of claim 1 wherein said composite polymer material is cured by exposure to light.

4. The formable RFID tag of claim 1 further comprising an adhesive layer provided on said tag inlay.

5. The formable RFID tag of claim 1 wherein said tag inlay is generally rectangular.

6. The formable RFID tag of claim 5 wherein said tag inlay has an upper tag inlay surface and a lower tag inlay surface and further comprises an adhesive layer provided on said upper tag inlay surface of said tag inlay.

7. The formable RFID tag of claim 1 wherein the RFID circuitry comprises non-rigid RFID circuitry.

8. The formable RFID tag of claim 1 wherein the packaging container is an airtight packaging container and, when closed, prevents curing of the tag inlay by exposure to air.

9. A formable RFID tag, comprising:
- a tag inlay including a composite polymer material having a pliant and flexible pre-cured state and a hardened cured state;
- said composite polymer material is curable upon application to air and ultraviolet light;
- non-rigid RFID circuitry embedded in said tag inlay; and
- a non-rigid RFID antenna embedded in said tag inlay and interfacing with said RFID circuitry.

10. The formable RFID tag of claim 9 further comprising an adhesive layer provided on said tag inlay.

11. The formable RFID tag of claim 9 wherein said tag inlay is generally rectangular.

12. The formable RFID tag of claim 11 wherein said tag inlay has an upper tag inlay surface and a lower tag inlay surface.

13. The formable RFID tag of claim 12 further comprising an adhesive layer provided on said upper tag inlay surface of said tag inlay.

14. The formable RFID tag of claim 9 further comprising an airtight packaging container and wherein said tag inlay is contained in said packaging container.

15. A formable RFID tag installation method, comprising:
- providing a packaging container and an RFID tag inside the packaging container, the RFID tag including RFID circuitry, a non-rigid RFID antenna, and a pre-cured, pliant and flexible composite polymer material, the RFID tag encapsulating said RFID circuitry and said RFID antenna in said composite polymer material;
- providing a surface having an irregular contour;
- applying and conforming said RFID tag to said irregular contour of said surface; and
- after applying and conforming the RFID tag, completing curing of said composite polymer material of said RFID tag.

16. The method of claim 15 wherein said curing said composite polymer material comprises exposing said composite material to air.

17. The method of claim 15 wherein said curing said composite polymer material comprises exposing said composite polymer material to a light source.

18. The method of claim 15 wherein said curing said composite polymer material comprises exposing said composite polymer material to ambient air by opening said packaging container.

19. The method of claim 18 further comprising accelerating curing of said composite polymer material by exposing said composite polymer material to ultraviolet light.

20. The method of claim 15 wherein the RFID tag further comprises an adhesive layer on said RFID tag inside the packaging container and wherein said applying and conforming said RFID tag to said irregular contour of said surface comprises applying said adhesive layer to said surface.

* * * * *